United States Patent Office 3,140,249
Patented July 7, 1964

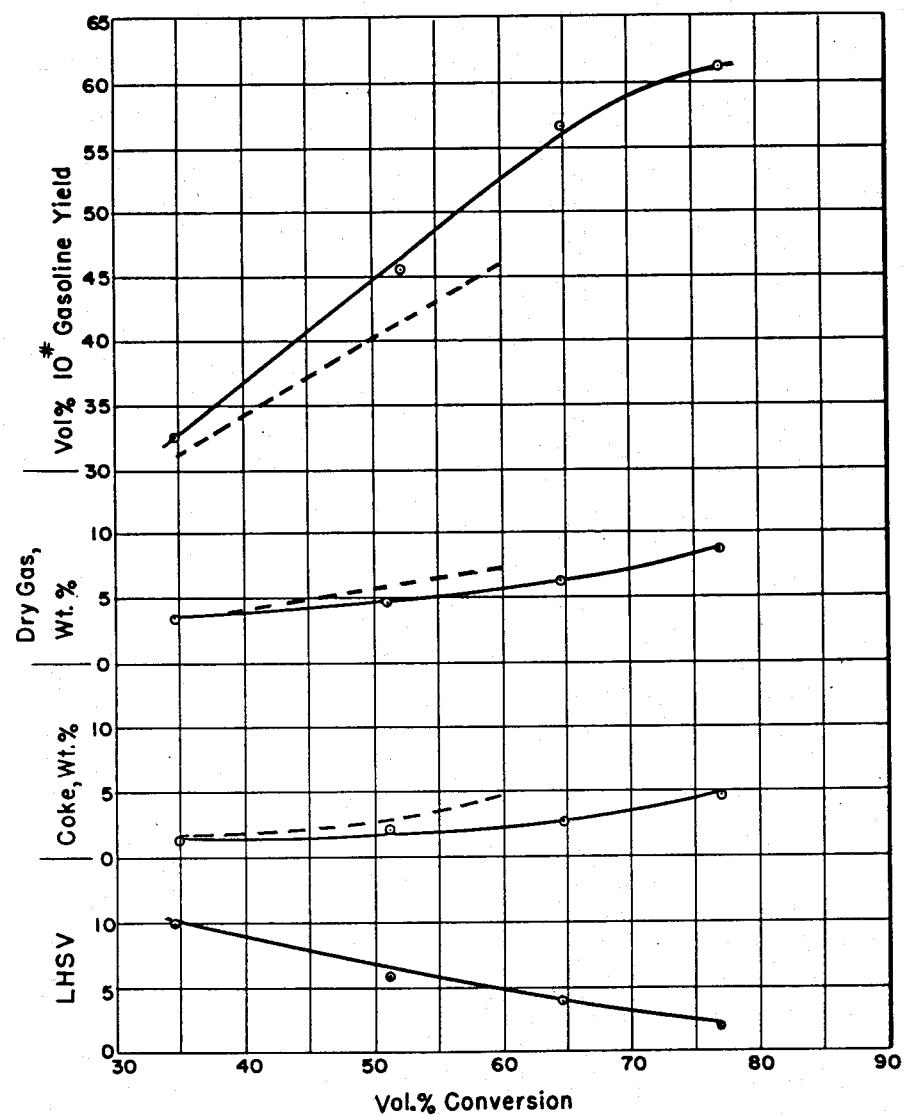

3,140,249
CATALYTIC CRACKING OF HYDROCARBONS WITH A CRYSTALLINE ZEOLITE CATALYST COMPOSITE
Charles J. Plank, Woodbury, and Edward J. Rosinski, Almonesson, N.J., assignors to Socony Mobil Oil Company, Inc., a corporation of New York
Filed July 12, 1960, Ser. No. 42,284
21 Claims. (Cl. 208—120)

This invention relates to the catalytic conversion of hydrocarbon oils into lower normally liquid and normally gaseous products and to an improved catalyst for effecting said conversion. More specifically, the invention relates to catalytic cracking of hydrocarbon oils in the presence of a new and improved catalyst. In one embodiment, the invention is concerned with an improved aluminosilicate-siliceous gel cracking catalyst, characterized by unusual attrition resistance, activity, selectivity and stability to deactivation by steam. In another embodiment, the invention is directed to a method for preparing the aforementioned catalyst useful in catalytic cracking of heavy petroleum fractions to lighter materials boiling in the gasoline range.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commercially available cracking catalyst, a synthetic silica-alumina composite catalyst is by far the most widely used. While such type catalyst is superior in many ways to the earlier employed clay catalysts and is fairly satisfactory, it is subject to improvement, particularly in regard to its ability to afford a high yield of useful product with a concomitant small yield of undesired product.

Modern catalytic processes, moreover, require catalysts which are not only specifically active in the chemical reactions which are to be catalyzed but also possess physical characteristics required for successful commercial operation. One of the outstanding physical attributes of a commercial catalyst is hardness, i.e., the ability to resist attrition. The ability of a particle to hold its shape in withstanding the mechanical handling to which it is subjected upon storage, shipment and use is a primary requirement for a successful catalyst and for modern catalytic processes.

Thus, commercial catalytic cracking has been carried out by contacting a hydrocarbon charge in the vapor or liquid state with a catalyst of the type indicated hereinabove under conditions of temperature, pressure and time to achieve substantial conversion of the charge to lower boiling hydrocarbons. Such cracking processes are generally advantageously carried out employing methods wherein the catalyst is subjected to continuous handling. In these operations, a continuously moving stream of hydrocarbon feed is contacted with a continuously moving stream of catalyst for the accomplishment of conversion and thereafter the catalyst is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be reused in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous catalyst having the ability to withstand abrasion during the necessary handling involved during continual conversion and regeneration is definitely to be desired.

During catalytic conversion of high boiling hydrocarbons to lower boiling hydrocarbons, the reaction which takes place is essentially a cracking to produce lighter hydrocarbons but is accompanied by a number of complex side reactions, such as aromatization, polymerization, alkylation and the like. As a result of these complex reactions, a carbonaceous deposit is laid down on the catalyst commonly called "coke." The deposition of coke tends to seriously impair the catalytic efficiency of the catalyst for the principal reaction and the conversion reaction is thereafter suspended after coke to the extent of a few percent by weight has accumulated on the catalyst. The catalystic surface is then regenerated by burning the coke in a stream of oxidizing gas and the catalyst is returned to the conversion stage of the cycle.

As will be realized, coke and other undesired products are formed at the expense of useful products, such as gasoline. It will also be evident that during the period of regeneration, the catalyst is not being effectively employed for conversion purposes. It accordingly is highly desirable not only to afford a large overall conversion of the hydrocarbon charge, i.e., to provide a catalyst of high activity, but also to afford an enhanced yield of useful product, such as gasoline, while maintaining undesired product, such as coke, at a minimum. The ability of a cracking catalyst to so control and to direct the course of conversion is referred to as selectivity. Thus, an exceedingly useful and widely sought characteristic in a cracking catalyst is high selectivity.

Another important property desirable in a cracking catalyst is steam stability, i.e., the ability not to become deactivated in the presence of steam at an excessively high rate. As a result of coke formation, it has generally been necessary to regenerate the catalyst at frequent intervals, first by stripping out entrained oil by contacting with steam and then burning off the carbonaceous deposits by contacting with an oxygen-containing gas at an elevated temperature. However, it has been found that the cracking activity of the catalyst deteriorates upon repeated use and regeneration and the silica-alumina catalysts heretofore employed are sensitive to steaming. Since steaming has been found to be the most effective way of removing entrained oil from the spent catalyst prior to thermal regeneration with air and since steam is encountered in the seals and kiln of a commercal catalytic cracking unit, it is apparent that a catalyst characterized by good steam stability is definitely to be desired.

Inorganic oxide amorphous gels heretofore employed as hydrocarbon conversion catalysts have generally been prepared by the formation of a sol of desired composition that sets to a hydrogel after lapse of a suitable period of time. The hydrogel is then dried to remove the liquid phase therefrom. It has heretofore been suggested that various finely divided water-insoluble solids be added to the sol before the same undergoes gelation for the purpose of increasing the porosity of the ultimate dried gel so that the regeneration characteristics thereof are enhanced upon use in catalytic hydrocarbon conversion operations. It has also been proposed that pulverized dried gel, clay and similar materials be incorporated in the hydrosol before gelation in order that the hydrogel resulting upon setting of such hydrosol may be subjected to rapid drying without undergoing substantial breakage. The improved regeneration characteristics and the improvement in drying obtained have been attributed to the fact that the finely divided solid contained in the hydrosol does not shrink to the extent that the hydrogel does during drying, thereby creating in the resulting dried gel a large number of macropores having diameters greater than about 1000 Angstrom units. While the gels so prepared containing pulverized material of appreciable particle size exhibit improvement in regeneration and during drying, the physical strength thereof has been weakened due to the presence of large pores in the gel structure.

Gel preparation has heretofore been carried out by drying hydrogel in a mass, which is subsequently broken up into pieces of desired size. Hydrogen has also been prepared and dried in the form of small pieces of predetermined shape such as obtained by extrusion, pelleting or other suitable means. In more recent years, gels have been produced in the form of spheroidal bead-like particles. The latter have had the advantage over irregularly shaped gel particles and over those obtained by extrusion or pelleting by being more resistant to attrition. The incorporation of finely divided solids of the type referred to hereinabove in the hydrosol used for the formation of gel beads has been found to undesirably decrease the hardness characteristics thereof, rendering the gel beads so produced more susceptible to attrition.

In accordance with the present invention, there is now provided a catalyst for conversion of hydrocarbons, characterized by resistance to attrition, high activity, exceptional selectivity and steam stability resulting from intimate admixture of a finely divided aluminosilicate and a siliceous hydrogen under conditions such that the aluminosilicate is distributed throughout and held suspended in a matrix of the siliceous hydrogel which is subsequently washed free of water-soluble matter, dried and thermally activated at a temperature in the approximate range of 500° F. to 1500° F. The catalyst of the present invention, in contrast to previous conventional cracking catalysts, is produced from a crystalline aluminosilicate having a structure of rigid three dimensional networks characterized by uniform pores between 6 and 15 Angstrom units in diameter. The uniform pore openings in such range occur in all dimensions and permit easy access to the catalyst surface of all hydrocarbon reactant molecules and afford ready release of the product molecules. There is thus provided, in accordance with the present invention a catalyst characterized by exceptional activity, selectivity and stability when employed in cracking heavy petroleum hydrocarbons to lighter materials boiling in the range of gasoline.

In one embodiment, the present invention provides a method for preparing a unique cracking catalyst by dispersing in a siliceous sol, a finely divided aluminosilicate resulting from substantially complete base-exchange of the alkali metal content of a crystalline alkali metal aluminosilicate having uniform pore openings between 6 and 15 Angstrom units with an aqueous solution characterized by a pH in excess of about 4.5 and containing an ion capable of replacing said alkali metal, effecting gelation of said sol, washing the resulting hydrogel containing finely dispersed aluminosilicate free of water-soluble matter, drying and thermally activating the washed product by heating at a temperature in the approximate range of 500° F. to 1500° F. for at least about 1 hour.

In another embodiment, the present invention affords an effective cracking catalyst consisting essentially of a finely divided aluminosilicate substantially free of alkali metal, resulting from base-exchange of a crystalline alkali metal aluminosilicate having uniform pore openings between 6 and 15 Angstrom units with a base-exchange solution characterized by a pH in excess of about 4.5, said finely divided aluminosilicate being distributed in an amount corresponding to between about 5 and about 90 percent by weight of the finished catalyst in a matrix of an inorganic oxide gel selected from the group consisting of silica and composites of silica and an oxide of at least one metal selected from the group consisting of metals of groups IIA, IIIB, and IVA of the periodic table.

In still another embodiment, the present invention provides a cracking catalyst having exceptional stability, activity and selectivity prepared by dispersing in a siliceous sol a powdered crystalline alkali metal aluminosilicate having uniform pore openings between 6 and 15 Angstrom units, effecting gelation of said sol containing said aluminosilicate, base-exchanging the resulting product with an aqueous solution characterized by a pH in excess of about 4.5 and containing an ion capable of substantially completely replacing the alkali metal of said product, washing the base-exchanged material free of soluble anions, drying and thereafter thermally activating the washed product by heating at a temperature in the approximate range of 500° F. to 1500° F. for at least about 1 hour.

A still further embodiment of the invention affords a method for preparing a catalyst by dispersing in a sol consisting essentially of silica and which may have admixed therewith an oxide of a metal selected from the group consisting of metals of groups IIA, IIIB, and IVA of the periodic table, a powdered crystalline alkali metal aluminosilicate having uniform pore openings between 6 and 15 Angstrom units, effecting gelation of said sol containing said aluminosilicate, base-exchanging the resulting product with an aqueous solution characterized by a pH in the approximate range of 4.5 to 10, and containing an ion capable of replacing alkali metal, washing the base-exchanged material free of soluble anions, drying, thermally activating the washed material and subjecting the resulting product to a mild steam treatment, during which the extent of crystallinity is reduced by at least 25 percent and, preferably, at least 50 percent based on the crystalline content of the original aluminosilicate.

A still further embodiment of the invention resides in a process for catalytic cracking of hydrocarbon oils in the presence of the above catalyst in accordance with which an enhanced conversion of the charge stock to useful products is realized.

The crystalline alkali metal aluminosilicates employed in preparation of the instant catalyst are frequently referred to as synthetic zeolites. Such substances have been generally described by Barrer in several publications and in U.S. 2,306,610 and U.S. 2,413,134. These materials are essentially the dehydrated forms of crystalline hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities and channels are precisely uniform in size. The alkali metal aluminosilicate used in preparation of the present catalyst has a uniform port structure comprising openings characterized by an effective pore diameter of between 6 and 15 Angstroms.

In general, the process for preparing such alkali metal aluminosilicates involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12 and thereafter is dehydrated by heating.

Generally, an alkali metal silicate serves as the source of silica and an alkali metal aluminate as the source of alumina. An alkali metal hydroxide is suitably used as the source of the alkali metal ion and, in addition, contributes to the regulation of the pH. All reagents are preferably soluble in water. While it is contemplated that alkali metal aluminosilicates having the above-designated pore characteristics may be employed in preparation of the present catalyst, it is generally preferred to use a sodium aluminosilicate. Thus, assuming sodium as the alkali metal, the reaction mixture should contain a molar ratio of $Na_2O/SiO_2$ of at least 0.5/1 and generally not in excess of 2/1. Sodium aluminate having a molar ratio of $Na_2O/Al_2O_3$ in the range of 1/1 to 3/1 may be employed. The amounts of sodium silicate solution and sodium aluminate solutions are such that the mol ratio of silica to alumina in the final mixture is at least 2.2/1. Preferably, the reaction solution has a composition expressed as mixtures of oxides, within the following ranges $SiO_2/Al_2O_3$ of 3 to 5, $Na_2O/SiO_2$ of 1.2 to 1.5 and $H_2O/Na_2O$ of 35 to 60. The reaction mixture is placed in a suitable vessel which is closed to the atmosphere in order to avoid losses of water and the reagents are then heated for an appropriate length of time. A convenient and generally employed process for making the sodium aluminosilicate reactant involves preparing an aqueous solution of sodium aluminate and sodium hydroxide and then adding an aqueous solution of sodium silicate. While satisfactory crystallization may be obtained at temperatures from 21° C. to 125° C., the pressure being atmospheric or less, corresponding to the equilibrium of the vapor pressure with the mixture at the reaction temperature, crystallization is ordinarily carried out at about 100° C. As soon as the zeolite crystals are completely formed, they retain their structure and it is not essential to maintain the temperature of the reaction any longer in order to obtain a maximum yield of crystals.

After formation, the crystalline aluminosilicate is separated from the mother liquor, usually by filtration. The crystalline mass is then washed, preferably with water, and while on the filter, until the wash water, in equilibrium with the aluminosilicate, reaches a pH of 9 to 12. For purposes of the present invention, the sodium aluminosilicate crystals may be added without drying to the siliceous sol or hydrogel or may alternatively be initially dried, generally at a temperature between 25° C. and 150° C.

The catalysts utilized in the present process are prepared by intimately admixing a crystalline alkali metal aluminosilicate, such as described hereinabove, having a structure of rigid three dimensional networks characterized by a uniform effective pore diameter between 6 and 15 Angstrom units in finely divided form having a weight mean particle diameter of less than about 10 microns with a siliceous hydrogel, base-exchanging the resulting composite substantially free of alkali metal by treating with a solution characterized by a pH in excess of about 4.5, and containing an ion capable of replacing the alkali metal, washing the resulting base-exchanged material free of water-soluble matter, drying the washed composite and subjecting the same to a thermal activating treatment. Alternatively, the crystalline alkali metal aluminosilicate may undergo base-exchange, as above, prior to intimate admixture thereof with the siliceous hydrogel. In accordance with such manner of operation, the resulting mixture of finely divided previously base-exchanged aluminosilicate distributed throughout and held suspended in a matrix of the siliceous hydrogel, is washed free of soluble matter, dried and thermally activated.

Intimate admixture of the finely divided aluminosilicate and siliceous hydrogel may be accomplished, for example, by ball milling the two materials together over an extended period of time, preferably in the presence of water, under conditions to reduce the particle size of the aluminosilicate to a weight mean particle diameter of less than 10, and preferably within the range of 2 to 7 microns. Such method of admixture, however, is less preferred than that achieved by dispersing the powdered aluminosilicate in a siliceous hydrosol. Following this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. As noted hereinabove, it is essential that the aluminosilicate introduced into the hydrosol have a weight mean particle diameter less than 10 microns and preferably between 2 and 7 microns. The use of aluminosilicate having a weight mean particle diameter in excess of 10 microns gave rise to a physically weak product, while the use of aluminosilicate having a weight mean particle diameter of less than 1 micron produced a product of low diffusivity.

The powder-containing siliceous hydrosol sets to a hydrogel after lapse of a suitable period of time and the resulting hydrogel is base-exchanged, if zeolitic alkali metal has been introduced as a result of employing an alkali metal auminosilicate and is thereafter washed, dried to a gel and thermally activated at a temperature below the fusion point of the incorporated aluminosilicate powder. In has been found that the resulting siliceous gel-aluminosilicate product possesses unique properties as a cracking catalyst.

The siliceous gel employed serves as a matrix for the crystalline aluminosolicate powder distributed therein. While silica gel, as will be evident from data hereinafter set forth, may be utilized as a suitable matrix, it is preferred that the siliceous gel employed be a cogel of silica and an oxide of at least one metal selected from the group consisting of metals of Groups IIA, IIIB, and IVA of the Periodic Table. Such components include, for example, silica-alumina, silica-magnesia, silica-zirconia, silica-thoria, silica-beryllia, silica-titania, as well as ternary combinations such as silica-alumina-thoia, silica-alumina-zirconia, silica-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the metal oxide content ranging from zero to 45 weight percent. Siliceous hydrogels utilized herein and hydrogels obtained therefrom may be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline alumino-silicate and siliceous gel matrix may vary widely with the crystalline aluminosilicate content ranging from about 5 to about 90 percent by weight and more usually, particularly where the composite is prepared in the form of beads, in the range of about 10 to about 50 percent by weight of the composite.

The siliceous gel-aluminosilicate product may be prepared in any desired physical form. Thus, the hydrosol containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. The method of the invention, as indicated above, has been found to be particularly useful for the production of catalyst in the form of spheroidal particles. The hydrosol containing powdered aluminosilicate produced in accordance with this invention may be made into spheroidal particles by any feasible process, such as methods described in patents to Marisic, for example, U.S. 2,384,946. Broadly, such methods involve introducing globules of hydrosol into a column of water-immiscible liquid; for example, an oil medium wherein the globules of hydrosol set to a hydrogel and subsequently pass into an underlying layer of water from which they are sluiced to further processing operations such as base-exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spherically shaped particles is of particular advantage in hydrocarbon conversion processes, including the moving catalyst bed processes, the fluidized process, etc. in which the spheroidal gel particles are subjected to continuous movement. As applied to the stationary bed, spheroidal catalyst particles provide effective contact between the reactants and the catalyst by avoiding channeling. It is accordingly a preferred embodiment of the present invention to prepare the described catalyst in the form of spheres, although it is to be realized that the method of the invention may also be employed in obtaining a mass of catalyst which may, thereafter, be broken up into particles of desired size. Likewise, the method described herein may be used for the preparation of the present catalysts in the form of particles of any other desired size or shape.

While, for the production of spheroidal catalyst particles by the aforementioned technique, initial formation of a hydrosol which sets upon lapse of a short interval of time to an all embracing bead-form hydrogel is essential, it is within the purview of this invention to also employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two.

As indicated hereinabove, the crystalline alkali metal aluminosilicate may be base-exchanged either before or after intimate admixture with the siliceous matrix material. Base-exchange is effected by treatment with a solution essentially characterized by a pH in excess of about 4.5, preferably by a pH in the range of 5 to 10, and containing an ion capable of replacing alkali metal. The alkali metal content of the finished catalyst should be less than about 1 and preferably less than about 0.5 percent by weight. The base-exchange solution may be contacted with the crystalline aluminosilicate of uniform pore structure in the form of a fine powder, a compressed pellet, extruded pellet, spheroidal bead or other suitable particle shape. It has been found that the desired base-exchange may be effected most readily if the alkali metal aluminosilicate undergoing treatment has not previously been subjected to a temperature above about 600° F.

Base-exchange required for introducing the necessary replacing ions is carried out for a sufficient period of time and under appropriate temperature conditions to replace at least about 90 percent of the alkali metal originally contained in the aluminosilicate and to effectively reduce the alkali metal content of the resulting composite to below about 1 weight percent. It is contemplated that any ionizable compound of a metal capable of replacing the alkali metal may be employed for base-exchange either alone or in combination with other ions. Compounds will be used wherein the replacing ion is in the cationic state. Inorganic salts will usually be employed. Suitable materials include soluble compounds of calcium, magnesium, manganese, vanadium, chromium, cerium, aluminum, lanthanum, praseodymium, neodymium, samarium and other rare earths, as well as solutions containing mixtures of these ions and mixtures of the same with other ions, such as ammonium. Organic salts of the foregoing metals, such as acetate and formate may also be used, as well as very dilute or weak acids. A particularly effective base-exchange solution is one containing calcium and ammonium ions in a ratio in the range of 20/1 to 0.5/1 and preferably 10/1 to 1/1, to effect replacement of the alkali metal ion with calcium and ammonium ions.

While water will ordinarily be the solvent in the base-exchange solutions used, it is contemplated that other solvents, although generally less preferred, may be used. Thus, in addition to aqueous solutions, alcoholic solutions, etc. of suitable compounds as noted above, may be employed in producing the catalyst utilized in the present process. It will be understood that the compounds employed for the base-exchange solution undergo ionization in the particular solvent used.

The concentration of compound employed in the base-exchange solution may vary depending on the nature of the particular compound used, on the alkali metal aluminosilicate undergoing treatment and on the conditions under which treatment is effected. The overall concentration of replacing ion, however, is such as to reduce the alkali metal content of the original alkali metal aluminosilicate to less than about 1 percent by weight, on a dry solids basis. Generally, the concentration of compound, the cation of which replaces alkali metal from the alkali metal aluminosilicate, is within the range of 0.2 to 30 percent by weight, although as noted hereinabove other solution concentrations may be employed, providing the alkali metal content is reduced to less than about 1 and preferably less than 0.5 percent by weight.

The temperature at which base-exchange is effected may vary widely, generally ranging from room temperature to an elevated temperature below the boiling point of the treating solution. While the volume of base-exchange solution employed may vary widely, generally an excess is employed and such excess is removed from contact with the crystalline aluminosilicate after a suitable period of contact. The time of contact between the base-exchange solution and crystalline aluminosilicate in any instance in successive contacts is such as to effect replacement of the alkali metal ions thereof to an extent such that the alkali metal content of the composite after undergoing base-exchange is less than 1 percent by weight. It will be appreciated that such period of contact may vary widely depending on the temperature of the solution, the nature of the alkali metal aluminosilicate used, and the particular compound employed for base-exchange. Thus, the time of contact may extend from a brief period of the order of a few hours for small particles to longer periods of the order of days for large pellets.

After base-exchange treatment, the product is removed from the treating solution. Anions introduced as a result of treating with the base-exchange solution are removed by water-washing the treated composite for such period of time until the same is free of said anions. The washed product is then dried, generally in air, to remove substantially all the water therefrom. While drying may be effected at ambient temperature, it is more satisfactory to facilitate the removal of moisture by maintaining the product at a temperature between about 150 and about 600° F. for 4 to 48 hours.

The dried material is then subjected to an activating treatment essential to render the composition catalytically active. Such treatment entails heating the dried material in an atmosphere which does not adversely affect the catalyst such as air, nitrogen, hydrogen, flue gas, helium or other inert gas. Generally, the dried material is heated in air to a temperature in the approximate range of 500° F. to 1500° F. for a period of at least about 1 hour and usually between 1 and 48 hours. The finished catalyst product has a surface area, within the approximate range of 100 to 700 square meters per gram.

It has further been found that the catalyst selectivity of the above-described composition is greatly improved by subjecting the same to a mild steam treatment. Exposure of the catalyst to steam is, as will appear from data set forth hereinafter, a highly desirable step in obtaining a product capable of affording an enhanced yield of gasoline. Steam treatment may be carried out at a temperature within the approximate range of 800° F. to 1500° F. for at least about 2 hours. Usually, steam at a temperature of about 1000° F. to 1300° F. will be used with the treating period extending from about 2 to about 100 hours. Temperatures above 1500° F. may be detrimental and should generally be avoided. Also, an atmosphere consisting of a substantial amount of steam, say at least about 10 percent by volume, but containing air or other gas substantially inert with respect to the composite being treated may be used and such mixtures may, in some instances, be desirable with the use of the more elevated temperatures to avoid possible deactivation of the catalyst. The above-noted steam treatment serves to convert a substantial portion of the crystallinity of the original aluminosilicate to non-crystalline or amorphous material. It is thus a particular embodiment of the invention that at least about 25 percent and, preferably, at least 50 percent of the original crystallinity possessed by the aluminosilicate structure be converted to amorphous material to achieve a resulting catalyst product of optimum cracking characteristics.

Cracking, utilizing the catalyst described herein, may be carried out at catalytic cracking conditions employing a temperature within the approximate range of 700° F. to 1200° F. and under a pressure ranging from sub-atmospheric pressure up to several hundred atmospheres. The contact time of the oil within the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fluidized mass or as a compact particle-form moving bed.

The cracking activity of the catalyst is a measure of its capacity to catalyze conversion of hydrocarbons and is expressed herein as the percentage conversion of a Mid-Continent gas oil having a boiling range of 450 to 950° F. to gasoline having the end point of 410° F. by passing vapors of the said gas oil through the catalyst at 875° F., substantially atmospheric pressure and a feed rate of 1.5–7.5 volumes of liquid oil per volume of catalyst per hour for ten minute runs between regenerations.

Steam stability of the catalyst prepared in accordance with the method described herein was determined by an accelerated test which simulates the conditions encountered during catalyst use. In this test, the catalyst is contacted with 100 percent steam at 1225° F. and atmospheric pressure for 20 hours and the cracking activity is then determined and compared with the cracking activity of fresh, unsteamed catalyst. The results thus obtained are indicative of the stability of the catalyst.

It has been found desirable in analyzing the results obtained with the catalyst described hereinabove to compare the same with those realized with a conventional commercial silica-alumina gel cracking catalyst containing approximately 10 weight percent alumina. The exceptional activity, stability and selectivity of the present catalyst is emphasized by the fact that when tested for gas oil cracking at a liquid hourly space velocity of 3 after being treated with 100 percent steam for 20 hours at 1225° F., the instant catalyst afforded about 65% conversion of the gas oil charge while a standard silica-alumina catalyst so treated gave only about 55% conversion at a liquid hourly space velocity of 1.5. Thus, the catalyst described herein is over twice as active as conventional silica-alumina cracking catalyst. In addition, the present catalysts have a very high degree of steam stability. Of even more importance is the fact that their selectivity in gas oil cracking is extraordinary. Using the instant cracking catalyst, it has been found possible to obtain up to 10 percent more gasoline than when the gas oil was cracked to the same extent over the conventional silica-alumina catalyst. Such additional gasoline is obtained at the expense of $C_4$'s and the undesirable products of cracking, i.e., dry gas and coke. The method of measuring and specifying selectivity of the instant catalyst was to compare the various product yields obtained with such catalyst with yields of the same products given by conventional silica-alumina catalyst at the same conversion level. The differences ($\Delta$ values) shown hereinafter represent the yields given by the present catalyst minus yields given by the conventional catalyst.

The following comparative examples serve to illustrate the advantages of the process and catalyst of the present invention without limiting the same.

EXAMPLE 1

Crystalline sodium aluminosilicate characterized by a structure having a uniform effective pore diameter in the range of 6 to 15 Angstrom units was prepared by admixture of the following solutions.

A. Sodium silicate solution:

| | Lbs. |
|---|---|
| Water | 143 |
| Sodium hydroxide (77.5% $Na_2O$) | 11 |
| Sodium silicate (28.8% $SiO_2$) | 77.5 |
| | 231.5 |

B. Sodium aluminate solution:

| | |
|---|---|
| Water | 195 |
| Sodium hydroxide (77.5% $Na_2O$) | 11 |
| Sodium aluminate (43.5% $Al_2O_3$ and 30.2% $Na_2O$) | 25.6 |
| | 231.6 |

Solution B having a specific gravity at 111° F. of 1.128 was added to Solution A, having a specific gravity of 1.172 at 68° F. with vigorous agitation to form a creamy slurry. The resulting slurry was heated for 12 hours at 205° F. and was thereafter filtered. The filter cake was washed with water until the water in equilibrium with the washed solid had a pH of 11. The washed filter cake was then dried in air at a temperature of 280° F.

The dried product was then treated as follows: A 3.3 lb. portion of the dried cake was contacted with 4 batches of 6090 cc. each of 26 percent by weight aqueous solution of calcium chloride. Three contacts were made at a temperature of 180° F. for 24 hours each and one contact was made for about 72 hours at room temperature (approximately 75° F.). The filter cake obtained from the 4th concentrated calcium chloride treatment was further exchanged 4 times at room temperature (approximately 75° F.) with 6000 cc. each of an aqueous solution containing 2 percent by weight calcium chloride and 1 percent by weight ammonium chloride. Three of these were 2-hour exchanges and one was for approximately 19 hours. Thereafter, the filter cake was water-washed free of chloride ion and dried in air at 230° F. for 20 hours.

A silica hydrogel was prepared by admixture of the following solutions.

C. Sodium silicate solution: 2882 cc. of sodium silicate solution containing 0.208 gram $SiO_2$/cc. and having $Na_2O/SiO_2$ ratio of .3/1.

D. Acid solution:
384 cc. of 50% aqueous sulfuric acid solution.
6734 cc. of water.

Solution C was cooled to 40° F. and Solution D was cooled to 33° F. These solutions were mixed adding Solution C to Solution D. The resulting silica hydrosol was allowed to gel at 8.5 pH and the hydrogel so obtained was aged at room temperature (approximately 75° F.) for 20 hours. The hydrogel was then cut into cubes and base-exchanged with 1 percent aqueous sulfuric acid solution at a temperature of about 75° F. for four contact periods, two of which were overnight (approximately 20 hours), one of five hours, and one of two hours' duration. The treated hydrogel was then washed free of sulfate ion.

The washed silica hydrogel in the amount of 7538 grams containing 5.97 weight percent $SiO_2$ was intimately mixed with 150 grams of the above-described calcium-ammonium aluminosilicate, equivalent to 25 percent by weight crystalline aluminosilicate on a finished catalyst basis, along with 1500 cc. of water by ball milling together for 24 hours at room temperature (about 75° F.). The resulting wet slurry was then dried at 275° F. for 20 hours in air and then calcined for 10 hours in air at 1000° F.

Before testing for gas oil cracking, this catalyst was treated with 100 percent steam at 1225° F. for 20 hours at atmospheric pressure. As will be evident from the cracking data hereinafter set forth in Table I, this catalyst afforded an approximately 57 percent conversion of the gas oil charge at 1.5 liquid hourly space velocity. In addition to the above activity, it is apparent from the data that the cracking selectivity of this catalyst also was good. Thus, at the 57 percent conversion level, this catalyst afforded 6 percent more gasoline as compared to the standard commercial silica-alumina catalyst. This gain was at the expense of 5.3 percent less $C_4$'s and 2 percent less dry gas than the standard silica-alumina catalyst.

EXAMPLE 2

Crystalline sodium aluminosilicate was prepared as in Example 1 having a weight mean particle diameter of about 4.5 microns. The finely divided sodium aluminosilicate was incorporated into a silica gel resulting from admixture of the following solutions.

A. Sodium silicate solution:
    12.2 lbs. sodium silicate ($Na_2O/SiO_2=0.3/1$)
    8.8 lbs. water
    1.9 lbs. sodium aluminosilicate powder containing 55% solids at 230° F.
B. Acid solution:
    27.65 lbs. water
    2.95 lbs. of 97% aqueous sulfuric acid solution Solution A having a specific gravity of 1.220 at 80° F. and Solution B having a specific gravity of 1.061 at 78° F. were continuously mixed together through a nozzle using 398 cc. per minute of the silicate solution at 46° F. and 328 cc. per minute of the acid solution at 46° F. The resulting hydrosol, containing 25 percent by weight dispersed crystalline sodium aluminosilicate powder on a finished catalyst basis, was formed into spheroidal hydrogel beads by introducing globules of the sol into an oil medium such as described in the aforementioned Marisic patent. The hydrosol particles so formed set to firm hydrogel beads in 2.7 seconds at a pH of 8.2–9.1.

The resulting hydrogel beads were placed in a 2 percent by weight aqueous solution of calcium chloride base-exchange solution using ½ volume of solution per volume of beads. The calcium chloride base-exchange was continued for a total of three 2-hour and one overnight (approximately 20 hours) contact. This exchange was followed by 8 contacts with a combined exchange aqueous solution of 2 percent by weight calcium chloride and 1 percent by weight ammonium chloride. Six of these latter contacts were carried out for 2 hours and two were conducted for approximately 20 hours. The base-exchanged hydrogel was then washed continuously until the effluent water was free of chloride ion. The washed hydrogel beads were then dried in air at 270° F. for 20 hours and calcined at 1000° F. in air for 10 hours. The resulting catalyst upon analysis was found to contain 0.13 weight percent sodium, 3.58 weight percent calcium, 8.05 weight percent alumina, less than 0.09 percent sulfate and the balance silica.

This catalyst was steam treated and evaluated for cracking characteristics as described in Example 1. The results of cracking with this catalyst are set forth in Table I hereinbelow. It will be seen from such data that this catalyst afforded approximately 74 percent conversion of the gas oil charge at 1.5 liquid hourly space velocity. Such results represent a marked improvement over those obtained with the catalyst of Example 1 and are in sharp contrast with those obtained with a standard silica-alumina cracking catalyst. In addition to its very high activity, it is apparent from the data set forth in Table I that the cracking selectivity of this catalyst was unusually good. Thus, at the 74 percent conversion level, this catalyst produced 14.5 percent more gasoline as compared to the standard commercial silica-alumina catalyst. This exceptional gain was at the expense of 9.4 percent less $C_4$'s, 3.7 less dry gas and 2.8 percent less coke than the standard silica-alumina catalyst.

EXAMPLE 3

Another portion of the crystalline sodium aluminosilicate used in Example 2 was incorporated, to the extent of 25 percent by weight, in a silica-alumina gel matrix in a manner identical with that employed in the previous example.

The hydrogel in this instance was prepared by admixture of the following solutions.

A. Sodium silicate solution:
    42.6 wt. percent sodium silicate ($Na_2O/SiO_2=0.3/1$)
    53.1 wt. percent water
    4.3 wt. percent sodium aluminosilicate powder containing 55% solids at 230° F.
B. Acid solution:
    93.34 wt. percent water
    3.43 wt. percent aluminum sulfate
    3.23 wt. percent sulfuric acid Solution A having a specific gravity of 1.191 at 76° F. and Solution B having a specific gravity of 1.059 at 79° F. were continuously mixed together through a mixing nozzle using 398 cc. per minute of the silicate solution at 58° F. and 320 cc. per minute of the acid solution at 40° F. The resulting hydrosol, containing 25 percent by weight dispersed crystalline sodium aluminosilicate powder, on a finished catalyst basis, was formed into hydrogel beads at 63° F. with a gelation time of 1.7 seconds at a pH of 8.5.

The resulting hydrogel beads were placed in a 2 percent by weight aqueous solution of calcium chloride base-exchange solution immediately after forming, using ½ volume of solution per volume of beads. The calcium chloride base-exchange was continued for a total of three 2-hour and one overnight (approximately 20 hours) contacts at room temperature (approximately 75° F.). This exchange was followed by a combined exchange with an aqueous solution containing 2 percent by weight calcium chloride and 1 percent by weight ammonium chloride. Six of these contacts were carried out for 2 hours and two were conducted for approximately 20 hours. The base-exchanged hydrogel was then washed, dried, calcined and steam treated as in Example 2. The resulting catalyst contained, on a weight basis, 0.31 percent sodium, 3.96 percent calcium, 13.1 percent alumina, less than 0.09 percent sulfate and the balance silica. The surface area of the calcined catalyst before steam treatment was 526 m.²/gram and after steaming, the surface area was 259 m.²/gram.

This catalyst was evaluated for catalytic cracking in the manner described in the previous examples. The data obtained and summarized in Table I show the exceptionally high activity of this catalyst. Thus, an 80.4 percent conversion of the gas oil charge was obtained at 1.5 liquid hourly space velocity, along with good selectivity. A gasoline advantage of 9.9 percent more gasoline was obtained over the standard silica-alumina cracking catalyst along with 2.8 percent less dry gas and 4.4 percent less coke. At a liquid hourly space velocity of 3, this catalyst still provided a 65.8 volume percent conversion with a 10.4 percent gasoline advantage over the standard silica-alumina catalyst at the same conversion along with 2.9 percent less dry gas and 2.1 percent less coke.

From a comparison of the results obtained at a 3 liquid hourly space velocity with this catalyst and that of Example 2, it will be seen that the silica-alumina matrix used in preparation of the catalyst of this example afforded an improved catalyst over that of Example 2 wherein a silica matrix was employed.

A further unexpected advantage achieved by use of the silica-alumina over the silica matrix was observed from two further cracking tests, carried out in a manner identical with those described hereinabove, in which the gasoline produced from each of the two catalysts, was tested at 900° F. for octane number (Research with 3 cc. of tetraethyl lead). The results were as follows.

Catalyst: Octane No. of gasoline
Example 2 (SiO$_2$ matrix) _____ 94.7
Example 3 (SiO$_2$—Al$_2$O$_3$ matrix) _____ 96.5

Another highly unexpected aspect of the properties of the catalyst of Example 3 is the fact that its selectivity is as good as that achieved with the indicated acid calcium aluminosilicate obtained by comparative base-exchange of the crystalline sodium aluminosilicate. Such result is particularly surprising when it is considered that the catalyst of this example is diluted with 75 weight percent of silica-alumina of substantially the same composition as the standard silica-alumina catalyst against which a comparison is shown in Table I, now set forth below:

*Table I*

| Example No | 1 | 2 | 3 |
|---|---|---|---|
| Physical Properties: | | | |
| Apparent Density, g./cc.— | | | |
| Steamed [1] | 0.54 | 0.50 | 0.55 |
| Surface Area, m.$^2$/g.— | | | |
| Fresh | 577 | 442 | 526 |
| Steamed [1] | 284 | 366 | 259 |
| Composition: | | | |
| Na, wt. percent | | 0.13 | 0.31 |
| Ca, wt. percent | 2.2 | 3.58 | 3.96 |
| Al$_2$O$_3$, wt. percent | | 8.05 | 13.1 |
| SO$_4$, wt. percent | | <0.09 | <0.09 |

CRACKING DATA OF STEAMED [1] CATALYSTS

| Example No | 1 | 2 | 3 | | |
|---|---|---|---|---|---|
| Conversion, vol. percent | 56.7 | 74.5 | 52.0 | 80.4 | 65.8 |
| LHSV | 1.5 | 1.5 | 3.0 | 1.5 | 3.0 |
| 10 R.V.P. Gaso., vol. percent | 46.8 | 62.3 | 46.1 | 59.1 | 55.0 |
| XsC$_4$'s, vol. percent | 10.1 | 12.8 | 6.8 | 19.9 | 12.7 |
| C$_5$+ Gaso., vol. percent | 44.4 | 59.0 | 43.1 | 56.8 | 52.2 |
| Total C$_4$'s, vol. percent | 12.6 | 16.1 | 9.8 | 22.2 | 15.5 |
| Dry Gas, wt. percent | 5.2 | 6.7 | 4.4 | 8.8 | 5.9 |
| Coke, wt. percent | 4.5 | 5.7 | 3.4 | 6.8 | 3.8 |
| H$_2$, wt. percent | 0.05 | 0.02 | 0.01 | 0.03 | 0.02 |
| Δ Values to standard silica-alumina catalyst:[2] | | | | | |
| 10 R.V.P. Gaso., vol. percent | +6.0 | +14.5 | +7.4 | +9.9 | +10.4 |
| XsC$_4$'s, vol. percent | −5.8 | −10.3 | −7.2 | −5.6 | −6.8 |
| C$_5$+ Gaso., vol. percent | +5.6 | +13.7 | +6.3 | +10.0 | +9.8 |
| Total C$_4$'s, vol. percent | −5.3 | −9.4 | −6.1 | −5.9 | −6.2 |
| Dry Gas, wt. percent | −2.0 | −3.7 | −1.9 | −2.8 | −2.9 |
| Coke, wt. percent | +0.3 | −2.8 | −0.1 | −4.4 | −2.1 |

[1] Catalyst steamed 20 hours at 1225° F. with 100 percent steam at atmospheric pressure.
[2] Commercial silica-alumina gel cracking catalyst containing about 10 wt. percent Al$_2$O$_3$, 0.15 weight percent Cr$_2$O$_3$ and remainder SiO$_2$.

The catalyst of Example 3 was also further evaluated for gas oil cracking at various conversion levels. The conditions of cracking and data obtained are shown in Table II below:

*Table II*

| | | | | |
|---|---|---|---|---|
| LHSV | 2 | 4 | 6 | 10 |
| Cat./Oil | 3 | 1.5 | 1.0 | 0.6 |
| Temp., °F | 900 | 900 | 900 | 900 |
| Yields: | | | | |
| Conversion, vol. percent | 77.0 | 64.6 | 51.0 | 34.4 |
| C$_5$+ Gaso., vol. percent | 58.0 | 52.9 | 42.4 | 29.8 |
| 10# Gaso., vol. percent | 61.3 | 56.9 | 45.9 | 32.6 |
| Excess C$_4$, vol. percent | 15.8 | 9.3 | 7.0 | 3.9 |
| Total C$_4$, vol. percent | 19.1 | 13.3 | 10.5 | 6.7 |
| Dry Gas, wt. percent | 8.9 | 6.3 | 4.8 | 3.3 |
| Coke, wt. percent | 4.9 | 2.9 | 2.1 | 1.3 |
| Hydrogen, wt. percent | 0.034 | 0.019 | 0.024 | 0.014 |
| Δ Values to standard silica-alumina catalyst:[1] | | | | |
| C$_5$+ Gasol, vol. percent | +8.5 | +7.1 | +3.9 | +1.4 |
| 10# Gaso., vol. percent | +10.0 | +8.9 | +5.0 | +2.0 |
| Total C$_4$'s, vol. percent | −4.0 | −4.8 | −2.8 | −0.8 |
| Dry Gas, wt. percent | −2.4 | −2.1 | −1.3 | −0.4 |
| Coke, wt. percent | −3.1 | −2.6 | −0.9 | −0.1 |

[1] Commercial silica-alumina gel cracking catalyst containing about 10 wt. percent Al$_2$O$_3$, 0.15 weight percent Cr$_2$O$_3$ and remainder SiO$_2$.

The change in selectivity at the above various conversion levels is shown graphically in the attached figure wherein the liquid hourly space velocity employed, the gasoline yield, and the amount of dry gas and coke produced are plotted against the volume percent conversion and compared with the results obtained under identical conditions with a standard silica-alumina cracking catalyst. It will be seen from the figure and the data of Table II, the catalyst of the invention not only possessed marked selectivity and activity advantages over the conventional silica-alumina cracking catalyst but also was capable of efficient cracking at conversions far above the maximum practical limit obtainable with the conventional catalyst. Indeed, if comparison is made at the higher conversions, the catalyst of the invention showed increasingly greater advantages over the standard silica-alumina catalyst.

EXAMPLES 4–6

The catalysts of these examples were prepared in a manner entirely analogous to that of Example 2 with the exception that the content of crystalline sodium aluminosilicate incorporated in the silica gel matrix was varied as follows.

Example: Percent weight of crystalline sodium aluminosilicate
4 _____ 10
5 _____ 25
6 _____ 40

These catalysts were evaluated for cracking characteristics in the manner described hereinabove and the results are shown hereinafter in Table III.

By reference to such data, it will be seen that as the content of crystalline aluminosilicate was increased, the sodium and calcium content of the finished catalyst increased and the conversion of gas oil was increased. In this series maximum selectivity was obtained with the catalyst of 25% weight crystalline material, affording a 12.6 percent volume gasoline advantage and 9.0 volume percent less C$_4$'s, 4.2 weight percent less dry gas and 1.9 weight percent less coke as compared to the standard silica-alumina catalyst.

EXAMPLES 7–9

The catalysts of these examples were prepared in a manner entirely analogous to that of Example 3 with the exception that the content of crystalline sodium aluminosilicate incorporated in the silica-alumina gel matrix was varied as follows.

| Example: | Percent weight of crystalline sodium aluminosilicate |
|---|---|
| 7 | 10 |
| 8 | 25 |
| 9 | 40 |

These catalysts were evaluated for cracking characteristics in the same manner as the previous catalysts and the results are shown below together with the results of Examples 4–6 in Table III:

Solution A having a specific gravity of 1.202 at 76° F. and Solution B having a specific gravity of 1.057 at 76° F. were continuously mixed together through a mixing nozzle using 362 cc./minute of the silicate solution and 350 cc./minute of the acid solution. The resulting hydrosol, containing 25 percent by weight dispersed crystalline sodium aluminosilicate powder, on a finished catalyst basis, was formed into hydrogel beads at 64° F. with a gelation time of 2.3 seconds at a pH of 8.5.

The resulting hydrogel beads were base-exchanged, water-washed, dried, calcined and steam treated in the same manner as Example 3. The resulting catalyst con-

*Table III*

| Example No. | 4 | 5 | 6 | 7 | 8 | 9 |
|---|---|---|---|---|---|---|
| Description: | | | | | | |
| Matrix | $SiO_2$ | $SiO_2$ | $SiO_2$ | $SiO_2$-$Al_2O_3$ | $SiO_2$-$Al_2O_3$ | $SiO_2$-$Al_2O_3$ |
| Wt. Percent Crystalline Sodium Aluminosilicate | 10 | 25 | 40 | 10 | 25 | 40 |
| Composition: | | | | | | |
| Na, wt. percent | 0.03 | 0.11 | 0.36 | 0.12 | 0.2 | 0.51 |
| Ca, wt. percent | 2.39 | 3.65 | 4.57 | 3.06 | 4.03 | 3.35 |
| $Al_2O_3$, wt. percent | | | | 8.8 | 11.9 | 11.6 |
| $SO_4$ wt. percent | <0.09 | <0.09 | <0.09 | | | <0.09 |

CRACKING DATA OF STEAMED [1] CATALYSTS

| | | | | | | |
|---|---|---|---|---|---|---|
| Conversion, vol. percent | 45.7 | 69.7 | 75.5 | 67.9 | 73 | 76.4 |
| LHSV | 1.5 | 1.5 | 1.5 | 1.5 | 1.5 | 1.5 |
| 10 R.V.P. Gaso., vol. percent | 41.5 | 60.1 | 54.7 | 54.9 | 57.7 | 55.5 |
| Xs $C_4$'s, vol. percent | 5.5 | 10.7 | 17.3 | 14.0 | 15.8 | 18.8 |
| $C_5$+ Gaso., vol. percent | 38.6 | 56.4 | 52.4 | 54.0 | 55.3 | 52.9 |
| Total $C_4$'s, vol. percent | 8.0 | 14.4 | 19.6 | 16.4 | 18.3 | 21.0 |
| Dry Gas, wt. percent | 3.5 | 5.4 | 8.3 | 6.5 | 7.3 | 8.3 |
| Coke, wt. percent | 2.9 | 5.1 | 8.4 | 4.5 | 5.3 | 2.9 |
| $H_2$, wt. percent | 0.01 | 0.02 | 0.05 | 0.02 | 0.03 | 0.03 |
| Δ Values to standard silica-alumina catalyst:[2] | | | | | | |
| 10 R.V.P. Gaso., vol. percent | +6.0 | +12.6 | +6.1 | +9.4 | +10.4 | +6.7 |
| Xs$C_4$'s, vol. percent | −6.3 | −10.4 | −7.1 | −6.3 | −6.7 | −4.9 |
| $C_5$+ Gaso., vol. percent | +4.9 | +12.6 | +6.2 | +9.2 | +10.4 | +7.1 |
| Total $C_4$'s, vol. percent | −5.2 | −9.0 | −7.2 | −6.2 | −6.6 | −5.2 |
| Dry Gas, wt. percent | −1.7 | −4.2 | −2.8 | −2.7 | −2.9 | −2.5 |
| Coke, wt. percent | +0.2 | −1.9 | −1.6 | −2.0 | −2.8 | −1.3 |

[1] Steamed 20 hours at 1225° F. with 100% steam at atmospheric pressure.
[2] Commercial silica-alumina gel cracking catalyst containing about 10 wt. percent $Al_2O_3$, 0.15 weight percent $Cr_2O_3$ and remainder $SiO_2$.

Referring to the above tabulated data, it will again be seen that as the content of crystalline sodium aluminosilicate was increased for the catalysts of these examples, the sodium and calcium content of the finished catalyst increased and conversion of the gas oil charge increased. Maximum selectivity was achieved with the catalyst of 25 percent weight crystalline material, affording a 10.4 volume gasoline advantage and 6.6 volume percent less $C_4$'s, 2.9 weight percent less dry gas and 2.8 weight percent less coke as compared to the standard silica-alumina catalyst.

EXAMPLE 10

The catalyst of this example was prepared in a manner analogous to that of Example 3 by admixture of the following solutions.

A. Sodium silicate solution:
  34.8 lbs. sodium silicate ($Na_2O/SiO_2 = 0.3/1$)
  32.62 lbs. water
  6.5 lbs. sodium aluminosilicate powder containing 55 percent solids at 230° F.
B. Acid solution:
  57.1 lbs. water
  4.23 lbs. aluminum sulfate [$Al_2(SO_4)_3 \cdot 18H_2O$]
  1.98 lbs. sulfuric acid tained, on a weight basis, 0.32 percent sodium, 3.88 percent calcium, and 12.6 percent alumina, less than 0.03 percent sulfate and remainder silica.

This catalyst was evaluated for catalytic cracking as described hereinabove and the data obtained are hereinafter summarized in Table IV. Referring to such data, it will be seen that conversion of the gas oil charge was 59.9 volume percent, affording a 9.0 volume percent gasoline advantage, together with 2.3 weight percent less dry gas and 1.3 weight percent less coke than the standard silica-alumina cracking catalyst.

EXAMPLE 11

For this catalyst, a batch of crystalline sodium aluminosilicate was prepared in a manner identical with that described in Example 1. This material was converted before drying to a mixed calcium-ammonium aluminosilicate by base-exchanging the filter cake with 4 batches of 6090 cc. each of a 27.5 percent by weight aqueous solution of calcium chloride. Three contacts were made at a temperature of 180° F. for 24 hours each and one contact was made for about 72 hours at room temperature (approximately 75° F.). The filter cake obtained from the 4th concentrated calcium chloride treatment was further exchanged 4 times at approximately 75° F. with 6090 cc. each of an aqueous solution containing 2 percent by weight calcium chloride and 1 percent by weight ammonium chloride. Three of these were 2-hour exchanges and one was for approximately 16 hours. Thereafter, the filter cake was washed free of chloride ion, dried in air at 230° F. for 20 hours.

The powdered calcium-ammonium aluminosilicate was then incorporated to the extent of 25 percent by weight based on the finished catalyst in a silica-alumina gel matrix containing approximately 93 percent $SiO_2$ and 7 percent $Al_2O_3$ and processed in a manner identical with that employed in preparing the catalyst of Example 10.

This catalyst was evaluated for catalytic cracking and the results together with those obtained with the catalyst of Example 10 are shown in Table IV below:

Table IV

| Example No | 10 | 11 |
|---|---|---|
| Composition: | | |
| Na, wt. percent | 0.32 | 0.06 |
| Ca, wt. percent | 3.88 | 3.9 |
| $Al_2O_3$, wt. percent | 12.6 | 11.7 |
| $SO_4$, wt. percent | <0.03 | <0.09 |
| CRACKING DATA OF STEAMED [1] CATALYST | | |
| Conversion, vol. percent | 59.9 | 56.5 |
| LHSV | 3.0 | 3.0 |
| 10 R.V.P. Gaso., vol. percent | 51.3 | 49.2 |
| $XsC_4$'s, vol. percent | 9.9 | 9.8 |
| $C_5+$ Gaso., vol. percent | 48.4 | 46.5 |
| Total $C_4$'s, vol. percent | 12.8 | 12.4 |
| Dry Gas, wt. percent | 5.5 | 5.1 |
| Coke, wt. percent | 3.4 | 3.0 |
| $H_2$, wt. percent | 0.02 | 0.02 |
| Δ Values to standard silica-alumina catalyst:[2] | | |
| 10 R.V.P. Gaso., vol. percent | +9.0 | +9.4 |
| $XsC_4$'s, vol. percent | −7.2 | −5.0 |
| $C_5+$ Gaso., vol. percent | +8.3 | +8.1 |
| Total $C_4$'s, vol. percent | −6.5 | −5.4 |
| Dry Gas, wt. percent | −2.3 | −2.0 |
| Coke, wt. percent | −1.3 | −1.2 |

[1] Steamed 20 hours at 1225° F. with 100% steam at atmospheric pressure.
[2] Commercial silica-alumina gel cracking catalyst containing about 10 wt. percent $Al_2O_3$, 0.15 weight percent $Cr_2O_3$ and remainder $SiO_2$.

It will be seen from a comparison of the results obtained with the catalysts of Examples 10 and 11 that there was little difference in activity and selectivity between these two catalysts showing that improved cracking characteristics of the resulting catalyst may be achieved by conversion through base-exchange to the desired form of the crystalline sodium aluminosilicate either before or after incorporation in the siliceous hydrogel.

EXAMPLES 12–14

These three examples were all prepared in a manner identical with that of Example 3 with the exception that the relative proportions of acid and silicate solutions were varied by changing their relative rates of addition through the mixing nozzle. Such variation served to control the pH of the resulting sol and hydrogel as follows.

Example:               pH
12 ----------------------------------------- 7–7.5
13 ----------------------------------------- 8.1–8.9
14 ----------------------------------------- 9.5–9.7

These catalysts were evaluated for cracking characteristics in the same manner as the previous catalysts and the results are shown in Table V below:

Table V

| Example No | 12 | 13 | 14 |
|---|---|---|---|
| Forming pH | 7–7.5 | 8.1–8.9 | 9.5–9.7 |
| Composition: | | | |
| Na, wt. percent | 0.19 | 0.59 | 0.15 |
| Ca, wt. percent | 4.09 | 4.28 | 18.9 |
| $Al_2O_3$, wt. percent | 12.6 | 12.6 | 12.2 |
| $SO_4$, wt. percent | <0.09 | <0.09 | <0.09 |
| CRACKING DATA OF STEAMED [1] CATALYSTS | | | |
| Conversion, vol. percent | 65.1 | 67.7 | 60.8 |
| LHSV | 3.0 | 3.0 | 3.0 |
| 10 R.V.P. Gaso., vol. percent | 56.1 | 55.9 | 52.8 |
| $XsC_4$'s, vol. percent | 12.3 | 13.3 | 10.0 |
| $C_5+$ Gaso., vol. percent | 53.4 | 53.4 | 50.0 |
| Total $C_4$'s, vol. percent | 15.0 | 15.9 | 12.8 |
| Dry Gas, wt. percent | 5.5 | 6.4 | 5.2 |
| Coke, wt. percent | 3.2 | 4.3 | 3.8 |
| $H_2$, wt. percent | 0.02 | 0.02 | 0.02 |
| Δ Values to standard silica-alumina catalyst:[2] | | | |
| 10 R.V.P. Gas, vol. percent | +11.7 | +11.6 | +10.1 |
| $XsC_4$'s, vol. percent | −6.8 | −6.9 | −7.4 |
| $C_5+$ Gaso., vol. percent | +11.3 | +11.4 | +9.5 |
| Total $C_4$'s, vol. percent | −6.4 | −6.6 | −6.8 |
| Dry Gas, wt. percent | −3.2 | −2.8 | −2.7 |
| Coke, wt. percent | −2.6 | −2.2 | −1.1 |

[1] Steamed 20 hours at 1225° F. with 100% steam at atmospheric pressure.
[2] Commercial silica-alumina gel cracking catalyst containing about 10 wt. percent $Al_2O_3$, 0.15 weight percent $Cr_2O_3$ and remainder $SiO_2$.

It will be evident from the foregoing data that change in forming pH of the hydrosol and hydrogel had no marked effect on the ability of the catalysts to efficiently crack the gas oil charge stock. These data show that while the activity is somewhat lower for the catalyst prepared at 9.5 pH, the selectivity of this catalyst is still very good.

EXAMPLE 15

The catalyst of this example was prepared in a manner identical to that of Example 13 with the exception that it was not subjected to steam treatment prior to testing for cracking characteristics. The catalyst of Example 13 was steamed 20 hours at 1225° F. with 100 percent steam before testing. The benefits of steam treatment are clearly evident from a comparison of the cracking data shown for the steamed and unsteamed catalyst in Table VI below:

Table VI

| | Example 15 | Example 13 |
|---|---|---|
| Conversion, vol. percent | 74.9 | 67.7 |
| Δ Values to standard silica-alumina catalyst: | | |
| $C_5+$ Gasoline, vol. percent | −1.3 | +11.4 |
| Total $C_4$'s, vol. percent | +0.9 | −6.6 |
| Dry Gas, wt. percent | −0.5 | −2.8 |
| Coke, wt. percent | −0.3 | −2.2 |

It will be seen from the above data, an initial steam treatment at essentially atmospheric pressure is very beneficial to the product distribution obtained with such catalyst. While such benefit may possibly be gained by slow steaming at low temperatures or low steam partial pressures in a commercial catalytic cracking operation using unsteamed catalyst, pretreating of the catalyst described herein with steam before introduction into a cracking unit is, as shown, by the above data, very beneficial.

EXAMPLES 16–25

The effect of base-exchange solution composition on the cracking characteristics of the resulting catalysts is shown by these examples.

These catalysts were prepared in the form of bead hydrogels, containing 25 percent by weight of crystalline sodium aluminosilicate, in a manner identical with that of Example 3. These materials were processed in a manner comparable to that used in Example 3 except that the composition of the base-exchange solutions was varied. The nature of the exchange solutions used in each of these examples together with the results obtained upon cracking with the catalysts in each instance are shown in Table VII below:

Table VII

| Example No. | 3 | 16 | 17 | 18 | 19 | 20 |
|---|---|---|---|---|---|---|
| Forming pH | 8.5 | 8.5 | 8.5 | 8.5 | 8.4-8.5 | 8.4-8.5. |
| Base Exchange: | | | | | | |
| Solution | $CaCl_2$ | $NH_4Cl$ | $CaCl_2$ | $ZrOCl_2 \cdot 8H_2O$ | $CaCl_2\text{-}AlCl_3$ | $CaCl_2$. |
| pH | 8.5-9 | 4.8 | 8.5-9 | 1.8 | | 8.5-9. |
| Conc. wt. percent | 2 | 2 | 2 | 3 | 2   3 | 2. |
| Exchanges: | | | | | | |
| 2 hours | 3 | 6 | 9 | 3 | 3 | 3. |
| 16 hours | 1 | 2 | 3 | 1 | 1 | 1. |
| Solution | $CaCl_2\text{-}NH_4Cl$[a] | | | $ZrOCl_2 \cdot 8H_2O\text{-}NH_4Cl$[b] | $CaCl_2\text{-}AlCl_3\text{-}NH_4Cl$ | $CaCl_2\text{-}NH_4Cl$. |
| Conc. wt. percent | 2   1 | | | 1.5   1 | 2   3   1 | 2   1. |
| Exchanges: | | | | | | |
| 2 hours | 6 | | | 4 | 6 | 7. |
| 16 hours | 2 | | | | 2 | 1. |
| Solution | | | | | | $AlCl_3$. |
| Conc. wt. percent | | | | | | 2. |
| Exchanges: 2 hours | | | | | | 2. |
| Physical properties of washed, dried (20 hrs. at 275° F. in air) and calcined (10 hrs. in air at 1000° F.) product: | | | | | | |
| Apparent Density, g./cc.— | | | | | | |
| Fresh | | | | | | |
| Steamed[1] | 0.55 | 0.81 | 0.55 | 0.75 | 0.86 | 0.66. |
| Surface area, m.²/g.: | | | | | | |
| Fresh | 526 | 452 | 505 | 425 | 386 | 408. |
| Steamed[1] | 259 | 156 | 339 | 182 | 150 | 212. |
| Composition: | | | | | | |
| Na, wt. percent | 0.31 | 1.09 | 0.21 | <0.05 | 0.02 | 0.23. |
| Ca, wt. percent | 3.96 | | 5.74 | | 0.05 | 0.84. |
| $Al_2O_3$, wt. percent | 13.1 | 13.6 | 13.0 | {12.2 / $ZrO_2$ 5.73} | | 16. |
| $SO_4$, wt. percent | <0.09 | | | 0.24 | | <0.09. |

CRACKING DATA ON STEAMED[1] CATALYSTS

| | 3 | 16 | 17 | 18 | 19 | 20 |
|---|---|---|---|---|---|---|
| Conversion, vol. percent | 80.4 | 65.8 | 50.9 | 61.3 | 52.9 | 62 | 46.9. |
| LHSV | 1.5 | 3.0 | 1.5 | 3.0 | 1.5 | 3.0 | 3.0. |
| 10 R.V.P. Gaso., vol. percent | 59.1 | 55.0 | 38.4 | 54.5 | 40.6 | 43.3 | |
| XsC₄'s, vol. percent | 19.9 | 12.7 | 14.1 | 8.9 | 15.4 | 17.8 | |
| C₅+ Gaso., vol. percent | 56.8 | 52.2 | 37.1 | 51.0 | 35.0 | 41.8 | 36.0. |
| Total C₄'s, vol. percent | 22.2 | 15.5 | 15.4 | 12.4 | 15.1 | 19.4 | 13.6. |
| Dry Gas, wt. percent | 8.8 | 5.9 | 5.7 | 5.0 | 6.2 | 7.6 | 5.4. |
| Coke, wt. percent | 6.8 | 3.8 | 2.7 | 3.6 | 2.8 | 5.2 | 2.1. |
| H₂, wt. percent | 0.03 | 0.02 | 0.04 | 0.02 | 0.02 | | |
| Δ Values to Standard Silica-Alumina Catalyst:[2] | | | | | | | |
| 10 R.V.P. Gaso., vol. percent | +9.9 | +10.4 | +0.3 | +11.5 | +0.7 | +0.2 | |
| XsC₄'s, vol. percent | −5.6 | −6.8 | +0.6 | −8.6 | −0.9 | −0.2 | |
| C₅+ Gaso., vol. percent | +10.0 | +9.8 | +0.9 | +10.3 | −2.1 | +0.9 | +1.6. |
| Total C₄'s, vol. percent | −5.9 | −6.2 | 0.0 | −7.4 | −1.2 | −0.9 | −0.2. |
| Dry Gas, wt. percent | −2.8 | −2.9 | −0.4 | −3.0 | −0.3 | −0.6 | 0.0. |
| Coke, wt. percent | −4.4 | −2.1 | −0.6 | −1.4 | −0.8 | +0.1 | −0.7. |

| Example No. | 21 | 22 | 23 | 24 | 25 | 26 |
|---|---|---|---|---|---|---|
| Forming pH | 8.4-8.5 | 8.4-8.5 | 8.4-8.5 | 8.4-8.5 | 8.3-8.7 | 8.4-8.5. |
| Base Exchange: | | | | | | |
| Solution | $CaCl_2\text{-}AlCl_3$ | $CaCl_2\text{-}AlCl_3$ | $CaCl_2\text{-}ZrOCl_2$ | $CaCl_2\text{-}MgCl_2$ | Acetic Acid | Rare Earth Metal Chloride. |
| pH | 6.5 | 4.5 | 6.7 | | 3.2 | 6.4. |
| Conc. wt. percent | 2 | 2 | 2 | 2   2 | 2 | 2. |
| Exchanges: | | | | | | |
| 2 hours | 9 | 9 | 9 | 9 | 9 | 9. |
| 16 hours | 3 | 3 | 3 | 3 | 3 | 3. |
| Solution | | | | | | |
| Conc. wt. percent | | | | | | |
| Exchanges: | | | | | | |
| 2 hours | | | | | | |
| 16 hours | | | | | | |
| Solution | | | | | | |
| Conc. wt. percent | | | | | | |
| Exchanges: 2 hours | | | | | | |
| Physical properties of washed, dried (20 hrs. at 275° F. in air) and calcined (10 hrs. in air at 1000° F.) product: | | | | | | |
| Apparent Density, g./cc.— | | | | | | |
| Fresh | | | | | | |
| Steamed[1] | 0.55 | 0.60 | 0.54 | 0.56 | | 0.65. |
| Surface area, m.²/g.: | | | | | | |
| Fresh | | 520 | 485 | 503 | | 506. |
| Steamed[1] | 294 | 261 | 320 | 303 | | 298. |
| Composition: | | | | | | |
| Na, wt. percent | 0.11 | 0.31 | 0.13 | 0.24 | 0.02 | 0.44. |
| Ca, wt. percent | 5.3 | 4.7 | 5.3 | {Ca 4.13 / Mg 1.32} | | |
| $Al_2O_3$, wt. percent | 13.3 | 12.8 | {$ZrO_2$ 1.3 / $Al_2O_3$ 12.8} | 12.7 | 10.9 | 11.5. |
| $SO_4$, wt. percent | | | | | | |

See footnotes at end of table.

Table VII—Continued

CRACKING DATA ON STEAMED[1] CATALYSTS

| Example No. | 21 | 22 | 23 | 24 | 25 | 26 |
|---|---|---|---|---|---|---|
| Conversion, vol. percent | 58.7 | 52.9 | 60.1 | 59.4 | 32.0 | 74.8 |
| LHSV | 3.0 | 3.0 | 3.0 | 3.0 | 4.0 | 3.0 |
| 10 R.V.P. Gaso., vol. percent | 54.1 | 48.9 | 54.1 | 51.8 | 27.0 | 57.4 |
| $XsC_4$'s, vol. percent | 8.3 | 6.6 | 8.8 | 9.1 | 5.8 | 16.8 |
| $C_5+$ Gaso., vol. percent | 51.0 | 45.8 | 51.0 | 48.7 | 25.3 | 55.0 |
| Total $C_4$'s, vol. percent | 11.4 | 9.7 | 12.0 | 12.2 | 7.5 | 19.3 |
| Dry Gas, wt. percent | 4.6 | 4.0 | 5.0 | 5.3 | 3.9 | 7.8 |
| Coke, wt. percent | 2.6 | 3.6 | 3.4 | 3.5 | 1.8 | 6.1 |
| $H_2$, wt. percent | 0.02 | 0.01 | 0.02 | 0.02 | 0.016 | 0.03 |
| Δ Values to Standard Silica-Alumina Catalyst:[2] | | | | | | |
| 10 R.V.P. Gaso., vol. percent | +12.4 | +9.8 | +11.6 | +9.7 | −2.0 | +9.6 |
| $XsC_4$'s, vol. percent | −8.3 | −7.7 | −8.3 | −7.7 | +1.3 | −6.4 |
| $C_5+$ Gaso., vol. percent | +11.4 | +8.7 | +10.7 | +8.7 | −1.5 | +9.6 |
| Total $C_4$'s, vol. percent | −7.3 | −6.6 | −7.3 | −6.8 | +0.8 | −6.3 |
| Dry Gas, wt. percent | −2.9 | −2.5 | −2.8 | −2.4 | +0.6 | −2.7 |
| Coke, wt. percent | −1.9 | −0.9 | −1.4 | −1.1 | +0.5 | −2.5 | a pH=6.3-6.4.  b pH=3.8.
[1] Steamed 20 hours at 1225° F. with 100% steam at atmospheric pressure.
[2] Commercial silica-alumina gel cracking catalyst containing about 10 wt. percent $Al_2O_3$, 0.15 weight percent $Cr_2O_3$ and remainder $SiO_2$.

It will be seen from the above data that it is not necessary to utilize a base-exchange solution of calcium chloride and ammonium chloride, but that calcium chloride can be used alone or various other base-exchange solutions containing ions capable of replacing sodium ions of the crystalline sodium aluminosilicate can also be used providing that the acidity of the solution is not such that the pH is below about 4.5. When the base-exchange solution is too acidic, i.e., possessing a pH below about 4.5 such as with the use of zirconyl chloride solution or acetic acid solution, a low activity catalyst with almost no selectivity advantage is obtained.

In particular, it will be seen from the results of Example 16 that ammonium chloride exchange solution used alone produced a low surface area, low activity catalyst having no substantial selectivity advantage over the silica-alumina standard cracking catalyst. Example 17 shows that use of a calcium chloride base-exchange solution alone afforded a catalyst possessing cracking characteristics equivalent to those obtained with a catalyst prepared with a combined base-exchange solution of calcium chloride and ammonium chloride. Examples 18-20 and 25 show that use of highly acidic exchange solutions, i.e., having a pH below about 4.5 gave catalysts with low activity and no substantial selectivity advantage. Examples 21-23, on the other hand, show that mixtures of calcium chloride and acidic materials can be used as base-exchange solutions to give high activity, highly selective catalysts providing the pH of the base-exchange solution exceeds about 4.5. Example 24 shows that a mixture of calcium and magnesium ions used for base-exchange afforded a resulting catalyst characterized by high activity and high selectivity.

EXAMPLE 26

The catalyst of this example was prepared in a manner completely analogous to that of Example 3 with the exception that the base-exchange solution employed was a 2 percent by weight aqueous solution of rare earth chloride derived from monazite sand and containing cerium chloride, along with the chlorides of praseodymium, lanthanum, neodymium, and samarium. Base-exchange was completed using nine 2-hour contacts and three overnight contacts of approximately 18 hours each. The finished catalyst product, upon analyses, showed a sodium content of less than 0.5 weight percent and a total rare earth oxide content of about 15 weight percent (primarily lanthanum and neodymium, with some samarium and cerium).

This catalyst was evaluated for cracking characteristics and from the results obtained, set forth in Table VII, it will be seen that the catalyst possessed a high activity with a volume percent conversion of 75 and an excellent selectivity affording a gasoline advantage of 9.6 volume percent with 2.7 weight percent less dry gas and 2.5 weight percent less coke than the standard silica-alumina cracking catalyst.

EXAMPLE 27

This example illustrates that other siliceous gels having acidic cracking sites, in addition to silica-alumina, may be used as the matrix through which the crystalline aluminosilicate is dispersed with results comparable to the catalysts made with silica-alumina.

In accordance with this example, crystalline sodium aluminosilicate, such as used in Example 2, was incorporated, to the extent of 25 percent by weight of the finished catalyst, in a silica-zirconia gel matrix.

The hydrogel in this instance was prepared by admixture of the following solutions.

A. Sodium silicate solution:
   12.2 lbs. sodium silicate ($Na_2O/SiO_2$=0.3/1)
   8.95 lbs. water
   1.9 lbs. sodium alminosilicate powder containing 55 percent solids at 230° F.

B. Acid solution:
   18.85 lbs. water
   1.49 lbs. zirconium sulfate $[Zr(SO_4)_2 \cdot 4H_2O]$
   0.76 lb. sulfuric acid Solution A having a specific gravity of 1.238 at 76° F. and Solution B having a specific gravity of 1.060 at 60° F. were continuously mixed together through a mixing nozzle using 380 cc./minute of the silicate solution and 336 cc./minute of the acid-zirconium sulfate solution. The resulting hydrosol was formed into hydrogel beads at 57° F. with a gelation time of 1.4 seconds at a pH of 8.3.

The resulting hydrogel beads were base-exchanged, washed, dried, calcined and steam treated in the same manner as in Example 3. The finished catalyst contained, on a weight basis, 0.19 percent sodium, 3.55 percent calcium, 7.9 percent zirconia and 6.36 percent alumina.

Catalytic cracking evaluation of this catalyst showed it to be characterized by substantially the same activity and selectivity as the catalyst of Example 10 which had a matrix of silica-alumina gel. The comparative cracking data obtained with each of these catalysts is shown below in Table VIII:

Table VIII
CRACKING DATA ON STEAMED CATALYSTS [1]

| Catalyst of Example | 10 | 27 |
|---|---|---|
| Type of Gel Matrix | $SiO_2/Al_2O_3$ | $SiO_2/ZrO_2$ |
| Conversion, vol. percent | 59.9 | 64.0 |
| LHSV | 3.0 | 3.0 |
| 10 R.V.P. Gaso., vol. percent | 51.3 | 54.9 |
| XsC₄'s, vol. percent | 9.9 | 10.4 |
| C₅+ Gaso., vol. percent | 48.4 | 51.9 |
| Total C₄'s vol., percent | 12.8 | 13.5 |
| Dry Gas, wt. percent | 5.5 | 5.9 |
| Coke, wt. percent | 3.4 | 3.8 |
| H₂, wt. percent | 0.02 | |
| Δ Values to standard silica-alumina catalyst: [2] | | |
| 10 R.V.P. Gaso., vol. percent | +9.0 | +8.0 |
| XsC₄'s, vol. percent | −7.2 | −7.0 |
| C₅+ Gaso., vol. percent | +8.3 | +7.1 |
| Total C₄'s, vol. percent | −6.5 | −6.1 |
| Dry Gas, wt. percent | −2.3 | −2.0 |
| Coke, wt. percent | −1.3 | −0.1 |

[1] Steam treated 20 hours at 1225° F. in 100% steam at atmospheric pressure.
[2] Commercial silica-alumina gel cracking catalyst containing about 10 wt. percent $Al_2O_3$, 0.15 weight percent $Cr_2O_3$ and remainder $SiO_2$.

It will be evident from the above that the catalyst of this example possessed good activity and high selectivity affording a gasoline advantage of 8.0 volume percent and 2.0 weight percent less dry gas than the standard silica-alumina cracking catalyst.

It is to be understood that the foregoing description is merely illustrative of preferred embodiments of the invention of which many variations may be made by those skilled in the art within the scope of the following claims without departing from the spirit thereof.

It is further to be noted that the disclosed but unclaimed subject matter relating to the concept of crystalline aluminosilicates having associated therewith both hydrogen ions or precursors thereof and metallic cations, including their method of preparation and cracking therewith, is disclosed and claimed in commonly-owned copending application Serial No. 161,242, filed December 21, 1961.

We claim:

1. A method for preparing a hydrocarbon conversion catalyst which comprises dispersing in a siliceous matrix a finely divided crystalline alkali metal aluminosilicate having uniform pore openings between 6 and 15 Angstrom units, base-exchanging the resulting product with a solution, characterized by a pH in excess of 4.5, containing an ion capable of replacing said alkali metal to effectively reduce the total alkali metal content in the resulting dried product to less than 1 percent by weight, washing the base-exchanged material free of soluble matter, drying and thereafter thermally activating the resulting product by subjecting the same to a temperature in the approximate range of 500° F. to 1500° F.

2. A method for preparing a hydrocarbon conversion catalyst, the total alkali metal content of which is less than about 1 percent by weight, which comprises dispersing in a siliceous sol, a finely divided aluminosilicate resulting from substantially complete base-exchange of the alkali metal content of a crystalline alkali metal aluminosilicate having uniform pore openings between 6 and 15 Angstrom units with a solution, characterized by a pH in excess of 4.5, containing an ion capable of replacing said alkali metal, effecting gelation of said sol containing finely divided aluminosilicate, washing the resulting hydrogel free of soluble matter, drying and thereafter thermally activating the washed product by subjecting the same to a temperature in the approximate range of 500° F. to 1500° F.

3. A method for preparing a catalytic composition useful in hydrocarbon conversion which comprises dispersing in a sol selected from those consisting of silica and composites of silica and an oxide of at least one metal selected from the group consisting of metals of Groups IIA, IIIB and IVA of the periodic table, a powdered crystalline alkali metal aluminosilicate having uniform pore openings between 6 and 15 Angstrom units, effecting gelation of said sol containing powdered alkali metal aluminosilicate, base-exchanging the resulting product with an aqueous solution, characterized by a pH in excess of 4.5, containing an ion capable of replacing said alkali metal to effectively reduce the total alkali metal content in the base-exchanged product to less than 1 percent by weight on a dry solids basis, washing the base-exchanged material free of soluble anions, drying and thermally activating the resulting material at a temperature in the approximate range of 500° F. to 1500° F. for at least about 1 hour.

4. A method for preparing a hydrocarbon conversion catalyst in the form of spheroidal particles which comprises dispersing in a siliceous sol a finely divided crystalline alkali metal aluminosilicate having uniform pore openings between 6 and 15 Angstrom units and a weight mean particle diameter of less than 10 microns, forming spheroidal particles of said sol containing finely divided alkali metal aluminosilicate, effecting gelation of said spheroidal particles of sol, base-exchanging the hydrogel particles with a solution, characterized by a pH in excess of 4.5, containing an ion capable of replacing said alkali metal to effectively reduce the total alkali metal content in the base-exchanged product to less than 1 percent by weight on a dry solids basis, washing the base-exchanged particles free of soluble matter, drying and thereafter thermally activating the washed product by subjecting the same to a temperature in the approximate range of 500° F. to 1500° F.

5. A method for preparing a hydrocarbon conversion catalyst which comprises dispersing in a hydrogel selected from the group consisting of silica, silica-alumina, silica-zirconia and silica-alumina-zirconia hydrogels, a finely divided alkali metal aluminosilicate having uniform pore openings between 6 and 15 Angstrom units, base-exchanging the resulting hydrogel with a solution, characterized by a pH in excess of 4.5, containing an ion capable of replacing said alkali metal to effectively reduce the total alkali metal content in the resulting dried product to less than 1 percent by weight, washing the base-exchanged material free of soluble matter, drying, and subjecting the resulting product to treatment with steam at a temperature in the range of about 800° F. to about 1500° F. for at least about 2 hours.

6. A method for preparing a hydrocarbon conversion catalyst, the total alkali metal content of which is less than about 1 percent by weight, which comprises dispersing in a sol selected from the group consisting of silica, silica-alumina, silica-zirconia and silica-alumina-zirconia, a finely divided aluminosilicate resulting from substantially complete base-exchange of the alkali metal content of a crystalline alkali metal aluminosilicate having uniform pore openings between 6 and 15 Angstrom units with a solution, characterized by a pH in excess of 4.5, containing an ion capable of replacing said alkali metal, effecting gelation of said sol containing finely divided aluminosilicate, washing the resulting hydrogel free of soluble matter, drying, and subjecting the resultant product to treatment with steam at a temperature in the range of about 800° F. to about 1500° F. for at least about 2 hours.

7. A method for preparing a hydrocarbon conversion catalyst which comprises dispersing in an inorganic oxide hydrogel a finely divided crystalline alkali metal aluminosilicate having uniform pore openings between 6 and 15 Angstrom units, base-exchanging the resulting hydrogel product with a solution, characterized by a pH in excess of 4.5 and containing an ion selected from the group consisting of calcium, magnesium, aluminum, and mixtures thereof with each other, to effectively reduce the total alkali metal content of the base-exchanged product to less than 1 percent by weight on a dry solids basis, washing the base-exchanged material free of soluble matter, drying and thermally activating the resulting product by subjecting the same to a temperature in the approximate range of 500° F. to 1500° F. for at least about 1 hour.

8. A method for preparing a catalytic composition, the total sodium content of which is less than 1 percent by weight, which comprises intimately admixing a finely divided substantially sodium-free crystalline aluminosilicate having a structure of rigid three dimensional networks characterized by uniform pores and an inorganic oxide gel under conditions such that the aluminosilicate is distributed throughout and held suspended in a matrix of the gel, washing the resulting material free of water-soluble matter, drying and thereafter thermally activating the resulting product by heating at a temperature in the approximate range of 500° F. to 1500° F.

9. A catalytic composition comprising a finely divided crystalline aluminosilicate having a structure of rigid three dimensional networks characterized by uniform pores suspended in and distributed throughout an inorganic oxide matrix, which composition has a sodium content of less than about 1 weight percent.

10. A catalytic composition comprising the product resulting from exposure for at least about 1 hour at a temperature between about 500° F. and about 1500° F. of a composite of a finely divided crystalline aluminosilicate, the cation of which is selected from the group consisting of calcium, aluminum, magnesium and mixtures thereof with each other suspended in and distributed throughout a matrix of an inorganic oxide gel selected from the group consisting of silica and composites of silica and an oxide of at least one metal selected from the group consisting of metals of Groups IIA, IIIB and IVA of the periodic table, which composition has a sodium content of less than about 1 weight percent.

11. A process for cracking a hydrocarbon charge which comprises contacting said charge under catalytic cracking conditions with the catalytic composition of claim 9.

12. A process for cracking a hydrocarbon charge which comprises contacting said charge under catalytic cracking conditions with the catalytic compositions of claim 10.

13. A catalytic composition comprising a finely divided calcium aluminosilicate having a structure of rigid three dimensional networks characterized by uniform pores suspended in and distributed throughout an inorganic oxide matrix, which composition has a sodium content of less than about 1 weight percent.

14. A catalytic composition comprising finely divided crystalline aluminosilicate having a structure of rigid three dimensional networks characterized by uniform pores suspended in and distributed throughout spheroidal particles of inorganic oxide gel, which composition has a sodium content of less than about 1 weight percent.

15. A process for cracking a hydrocarbon charge which comprises contacting said charge under catalytic cracking conditions with the catalytic composition of claim 14.

16. A catalytic composition comprising an inorganic oxide matrix having distributed therein a finely divided crystalline aluminosilicate, which aluminosilicate is obtained by: (1) crystallization from a reaction mixture whose composition expressed in terms of oxide mole ratios falls within the following ranges:

$SiO_2/Al_2O_3$ ------------------------- From 3 to 50
$Na_2O/SiO_2$ -------------------------- From 1.2 to 1.5
$H_2O/Na_2O$ -------------------------- From 35 to 60 and (2) subsequent base exchange of the resulting crystallized product substantially free of sodium ions, said composition having an overall sodium content of less than about 1 weight percent.

17. The process which comprises preparing a reaction mixture whose composition expressed in terms of oxide mole ratios falls within the following ranges:

$SiO_2/Al_2O_3$ ------------------------- From 3 to 5
$Na_2O/SiO_2$ -------------------------- From 1.2 to 1.5
$H_2O/Na_2O$ -------------------------- From 35 to 60 base exchanging the product which crystallizes from said mixture until said product is substantially free of sodium ions, combining the base-exchanged material, in finely divided form, with a porous inorganic oxide, the latter serving as a matrix for the former and the resultant composite having an overall sodium content less than about 1 weight percent and utilizing the composition so obtained as a catalyst in the conversion of hydrocarbons.

18. A method for preparing a hydrocarbon conversion catalyst, the total sodium content of which is less than about 1 percent by weight, which comprises dispersing in an inorganic oxide sol, a finely divided substantially sodium-free crystalline aluminosilicate having uniform pore openings between 6 and 15 Angstrom units and containing an ion selected from the group consisting of calcium, magnesium, aluminum and mixtures thereof with each other, effecting gelation of said sol containing finely divided aluminosilicate, washing the resulting hydrogel free of soluble matter, drying and thermally activating the resulting product by subjecting the same to a temperature in the approximate range of 500° F. to 1500° F. for at least about 1 hour.

19. A catalytic composition comprising spheroidal particles containing a minor proportion of a substantially sodium-free crystalline aluminosilicate having a structure of rigid three dimensional networks characterized by uniform pores and having a weight mean particle diameter of less than 10 microns suspended in and distributed throughout a matrix of an inorganic oxide gel selected from the group consisting of silica and composites of silica and an oxide of at least one metal selected from the group consisting of metals of Groups IIA, IIIB, and IVA of the periodic table, which composition has a sodium content of less than about 1 weight percent.

20. A process for cracking a hydrocarbon charge which comprises contacting said charge under catalytic cracking conditions with a catalyst comprising finely divided crystalline aluminosilicate having a structure of rigid three dimensional networks characterized by uniform pores suspended in and distributed throughout an inorganic oxide gel matrix, which catalyst has a sodium content of less than about 1 weight percent.

21. A process for cracking a hydrocarbon charge which comprises contacting said charge under catalytic cracking conditions with a catalyst comprising spheroidal particles containing a minor proportion of a substantially sodium-free crystalline aluminosilicate having a structure of rigid three dimensional networks characterized by uniform pores and having a weight mean particle diameter of between 2 and 7 microns suspended in and distributed throughout a matrix of an inorganic oxide gel selected from the group consisting of silica and composites of silica and an oxide of at least one metal selected from the group consisting of metals of Groups IIA, IIIB, and IVA of the periodic table, which catalyst has a sodium content of less than about 1 weight percent.

References Cited in the file of this patent

UNITED STATES PATENTS

| | | |
|---|---|---|
| 2,904,607 | Mattox et al. | Sept. 15, 1959 |
| 2,962,435 | Fleck et al. | Nov. 29, 1960 |
| 2,971,903 | Kimberlin et al. | Feb. 14, 1961 |
| 2,971,904 | Gladrow et al. | Feb. 14, 1961 |
| 2,983,670 | Seubold | May 9, 1961 |

OTHER REFERENCES

A Contribution to the Knowledge of Sodium Contamination on Cracking Catalyst, Baker et al., Journal of Physical and Colloid Chemistry, vol. 52, Issue No. 8, pages 1364 to 1372, November 1948.

UNITED STATES PATENT OFFICE
CERTIFICATE OF CORRECTION

Patent No. 3,140,249　　　　　　　　　　　　　July 7, 1964

Charles J. Plank et al.

It is hereby certified that error appears in the above numbered patent requiring correction and that the said Letters Patent should read as corrected below.

Column 25, line 67, for "3 to 50" read -- 3 to 5 --.

Signed and sealed this 3rd day of August 1965.

(SEAL)
Attest:

ERNEST W. SWIDER
Attesting Officer

EDWARD J. BRENNER
Commissioner of Patents